3 Sheets—Sheet 1.
P. P. STEWART.
Cooking Stove.
No. 1,684. Reissued May 31, 1864.
Fig: 5. B. b.
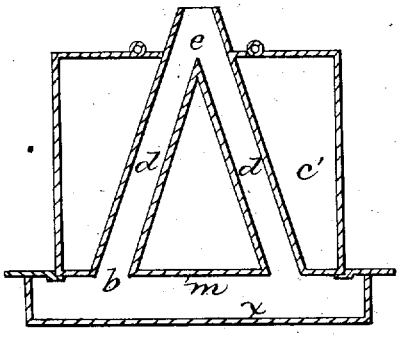
Fig: 2.
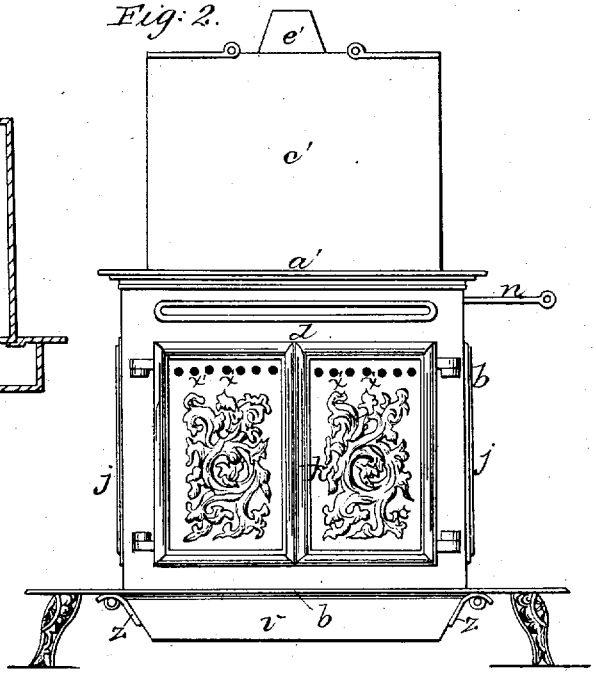
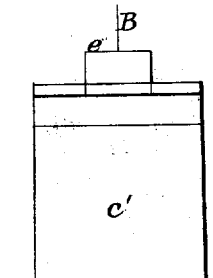
Fig: 1.
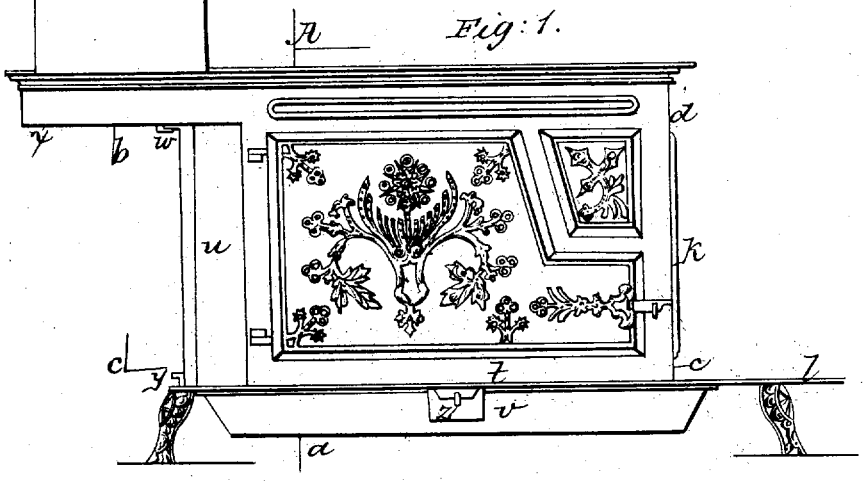
Witnesses.
Chas. D. Kellum
Marcus P. Norton
Inventor
Phila P. Stewart
N. PETERS. Photo-Lithographer, Washington, D. C.

3 Sheets--Sheet 2.
P. P. STEWART.
Cooking Stove.
No. 1,684.
Reissued May 31, 1864.
Fig: 4. A. a.
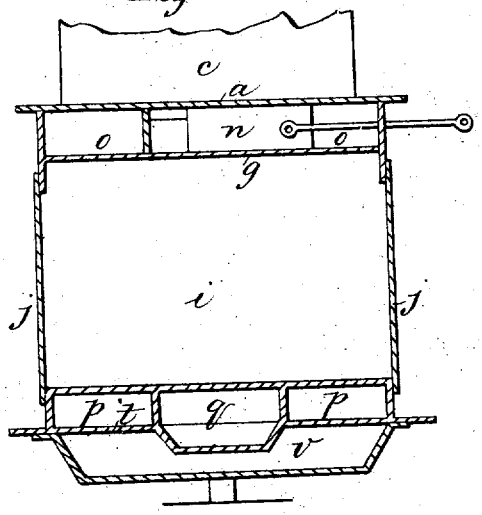
Fig: 6. C. c
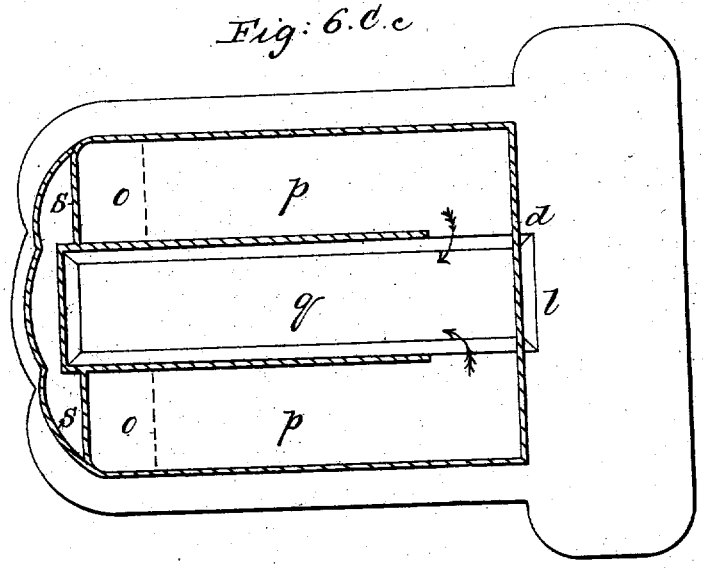
Witnesses.
Chas. D. Kellum
Marcus P. Norton
Inventor
Philo P. Stewart
N. PETERS, Photo-Lithographer, Washington, D. C.

3 Sheets--Sheet 3.

P. P. STEWART.

Cooking Stove.

No. 1,684.

Reissued May 31, 1864.

Witnesses.

Chas. D. Kellum

Marcus P. Norton

Inventor;

Philo P. Stewart

N. PETERS. Photo-Lithographer, Washington, D. C.

UNITED STATES PATENT OFFICE.

PHILO P. STEWART, OF TROY, NEW YORK.

IMPROVEMENT IN COOKING-STOVES.

Specification forming part of Letters Patent No. 22,681, dated January 18, 1859; Reissue No. 1,684, dated May 31, 1864.

*To all whom it may concern:*

Be it known that I, PHILO P. STEWART, of the city of Troy, county of Rensselaer, and State of New York, did on the 18th day of January, A. D. 1859, obtain of and from the United States certain Letters Patent for and upon new and useful Improvements in Cooking-Stoves, which said Letters Patent have been duly surrendered for the purpose of reissue of the same upon a correct and amended specification, as follows, to wit: I therefore do hereby declare that the following is a full, clear, and exact description of the same, reference being hereby had to the accompanying drawings and to the letters of reference marked thereon, which said drawings make a part of this specification.

Like letters represent and refer to like or corresponding parts.

Figure 8:
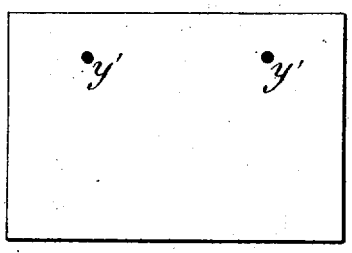
Figure 7:
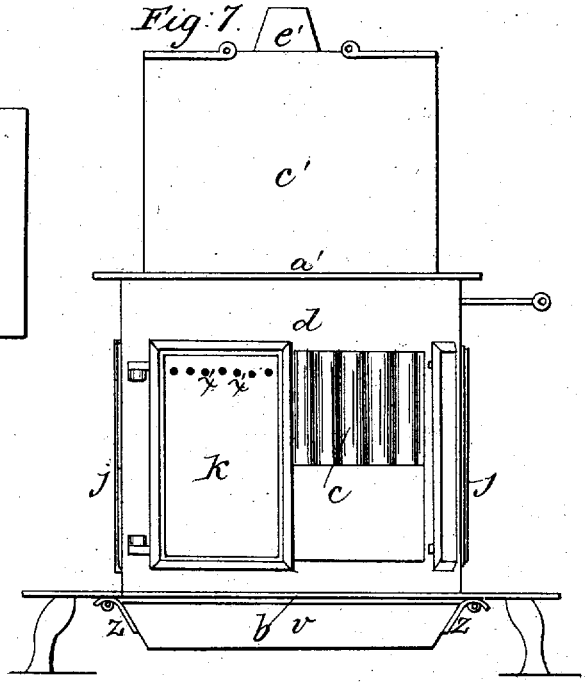
Figure 3:
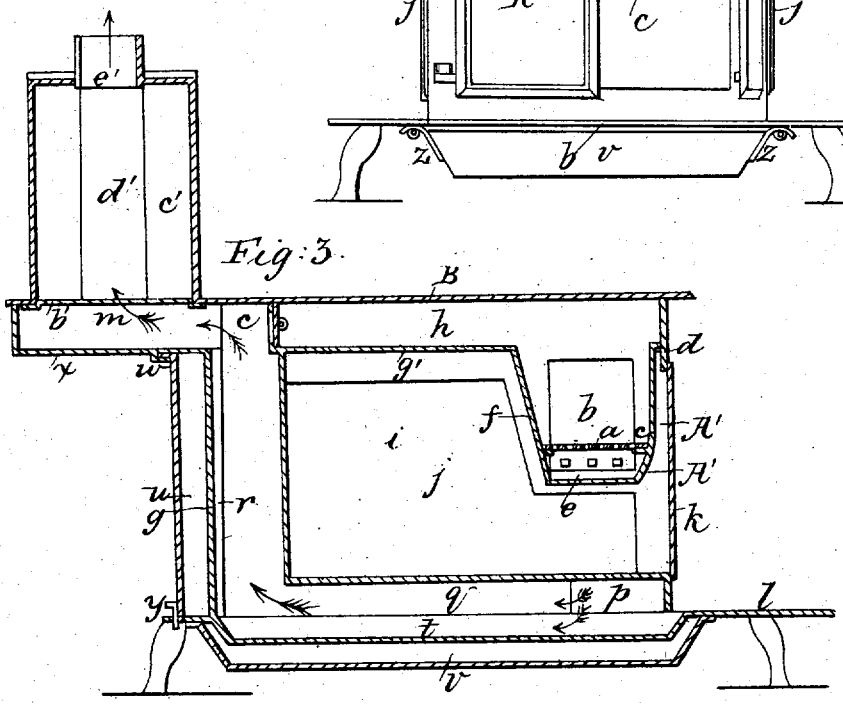

Figure 1 is a side elevation. Fig. 2 is a front elevation showing the doors and apertures hereinafter described and set forth. Fig. 3 is a longitudinal vertical section. Figs. 4, 5, and 6 are sections taken at the lines A *a*, B *b*, and C *c* of Fig. 1. Fig. 7 is a front elevation showing the front of the fire-box and the hot-air chamber or flue between the same and the front doors and communicating with the oven, and more fully hereinafter described. Fig. 8 shows the front of the back oven-plate with apertures therein for the purposes hereinafter described and set forth.

The nature of my invention consists in supplying the ovens of stoves with a continued fresh current of hot air, which shall be heated by the front plate of the fire-box as it passes into the oven down the flue or chamber between the front end plate of the stove and the fire-box, and which passes through the oven thereafter, whereby the operation of baking is greatly facilitated, and then passing out from the oven in a perfect and satisfactory manner, substantially as herein described.

It also consists in combining with a cook-stove doors in front of the oven and of sufficient capacity to receive an open tin kitchen or other roaster, so that the heat radiated by all the plates, and the back, front, and bottom plates of the fire chamber or box into the oven may thus be employed for roasting or baking in front of the oven, when combined with an end door, whereby the draft may be controlled without the aid and independent of the front doors, substantially as herein described.

It also consists in arranging with such stove a boiler at the back with two inclined flues having a removable cover, which receive the products of combustion separately at each side and from a flue chamber, in which the middle back flue discharges, and passing up obliquely in each until near the top, where the two flues join together to form the one connection with the pipe leading to the chimney. By this arrangement I am enabled to obtain an amount of heating-surface sufficient to keep up the required supply of hot water, which has heretofore been difficult to obtain in such stoves.

It also consists in the employment of bottom and back end casings, or additional bottom and back, made of tin or other suitable material, in combination with a three-flue stove for the purpose of preventing the escape of heat from that part of the stove and to retain the same at such parts of the stove without being much reduced in degree during the passage of the same down the back of the stove and under the bottom of the oven, whereby the operation of baking is much facilitated, as hereinafter more fully shown.

In the accompanying drawings, *a* represents the fire-place or box in front and extending entirely across the front end of the stove with a door, *b*, at one side for the supply of fuel. The front plate *c* of this fire-chamber may be as near the front plate *d* of the stove as may be deemed best, to give sufficient capacity to the flue or chamber A′ to receive and heat the air before it enters the oven *i* for the purposes herein described. The bottom plate *e* below the fire-box *a* and the back plate *f* and the bottom plate *g′* of the top flue *h* constitute the top of the oven *i*. This oven has doors *j* at the sides thereof for access thereto. It has also doors K in front thereof, which may extend up nearly to the top of the fire place or chamber, or they may extend up no farther than the under side of the said fire-chamber, as the case may be, for this part of my improvements will be the same in principle and operation in either case. When these doors are open and a tin kitchen or other roaster is placed in front of the said oven on the apron *l*, the heat radiated by the several plates into the oven, as aforesaid, will roast or bake such things as may be placed into such roaster for that purpose, while at the same time the said heat will be retained in the said oven, so that the process of baking may at the same time be therein going on. The said roaster for the time being closes up the front aperture produced by the opening of the said front doors K. When the said roaster is removed from the said oven, the said doors *k* are closed.

The said roaster may be of any suitable material and of any shape or form desirable. It must be of sufficient size to receive the open space caused by the opening of the said front doors, K, and may be securely fastened in front of said open doors to the main part of the stove in any convenient manner during the use required thereof, so that the radiated heat from the said front plate of said fire-chamber, or from the fire-chamber itself, may be used for the purpose of roasting or cooking such things as may be placed therein for that purpose. The said roaster is portable, and may be attached to or detached from the said front of the cooking-stove at the pleasure of the operator. This is convenient and useful.

The top flue *h* at the rear end opens directly into an exit flue chamber, *m*, through an aperture governed by a damper, *n*, which is opened to kindle the fire or when it is not desired to heat the oven for baking purposes; but when closed the top flue discharges into two diving side flues *o o* at the back, which discharge into two side flues *p p* at the bottom, passing directly under the bottom plate of the oven; and at the front end of the oven the said flues *p p* discharge into a return-flue, *q*, placed between them and running back and discharging into a vertical flue, *m'*, at the back and placed between the two diving or side flues, *o o*, and the upper end of this discharges into the exit-flue chamber *m*. The back and bottom of said flues are made by the oven plates and back plates *s* and bottom plate *t* of the stove with partition-plates, and these are inclosed by a false back, *u*, and false bottom, *v*, whenever, as before stated, it is desirable to prevent the heat from being radiated into the room. This extra back *u* is made either of sheet iron or tin with the edges fitting close to the surface of the stove, and with a flange at the top which enters under the cleat *w* on the under surface of the bottom plate *x* of the exit-flue chamber *m*, Fig. 3, and there firmly held by the pin *y* or any device which will answer the purpose required.

The second or extra bottom *v* has a rim all around the entire upper edge, which fits up against the bottom plate of the stove so that it may be firmly secured in place by bolts or pins passing through the eyes of the staples on the bottom plate of the stove. *z* is a lip or hasp on each side of the stove, which fits over the staples aforesaid, which, in connection with said staples and pins, holds the said second or extra bottom to its place.

The said second or extra back and bottom are so constructed as to form an air space or chamber between them and the plate of the stove, so that the air contained therein may act as a non conductor and prevent the radiation of heat into the room, and at the same time retain the heat much longer in the oven for baking or cooking purposes, by means of which there is a great economy in the use of fuel.

It will be seen that the said second or extra bottom and back have a twofold purpose, first, to prevent the radiation of heat into the room, which is very desirable, especially during the summer months; and, second, to retain the heat in the stove and oven, whereby roasting, baking, or cooking is carried on in the most perfect manner with great economy in fuel.

The top plate, B, of the stove extends back over the exit-flue space *m*, and, besides the usual boiler-holes, it has a large hole, *b'*, to receive a large boiler, *c'*, formed with two flues, *d' d'*, which pass through the bottom, one near each side thereof, and run up obliquely through and to the top of the boiler, when they unite in one, as at *e'*, to connect with the usual stove-pipe or chimney. As the heated products of combustion enter the flue-space *m* from the middle back flue they must spread and act under the boiler in order to get to the two flues in the bottom of the boiler, through which they ascend to the pipe.

The boiler *c'*, as is shown by the drawings, has a removable or hinged cover, thus allowing easy access to its interior for the supply or removal of its contents and the making of it closed or tight, as occasion or use may require. In this way the heated products of combustion not only act efficiently against the entire bottom of the boiler, but inside thereof through the two flues, which have their heating-surface increased by being inclined so as to form the single connection with the chimney, as aforesaid.

The front plate *c* of the fire box or chamber may be smooth or corrugated, as deemed best. Between this plate and the front doors and the front plate *d* above the doors is located the hot-air chamber or flue A, Fig. 3, above referred to. This chamber extends entirely across the stove and opens at the bottom thereof directly into the front part of the oven *i*, at or near the bottom plate *e* or lower part of the fire box or chamber. The cold air enters this chamber through the apertures *x'*, Figs. 2 and 7, and is heated in the said chamber A' as it passes downward to the bottom thereof, when it enters the oven *i*, through which it passes to and out through the openings *y'*, Fig. 8, which are in the back oven-plate at any required or desired point, and in number and capacity sufficient for ventilation and baking purposes. The capacity of the apertures *x'* should always be greater than that of the apertures *y'*, so as to always maintain sufficient heat in the said oven for the purposes required, while at the same time said oven is sufficiently ventilated and the continued current of fresh heated air is sufficiently hot to aid in baking, &c. If desirable, the said front oven-doors may not extend upward as high as shown in the drawings, but may extend no farther up than to the lower part of the fire box or chamber, in which case the front plate *d* will extend downward far enough to meet the upper end of the said front doors, K. The apertures *x'* in that case would be made through the said plate *d* instead of through the doors K. The principle and operation would be the same in either case. Should the said apertures *x'* be made at or near the lower part of the said hot-air chamber A', there would then be required a partition-plate in said chamber extending the whole length of said chamber and upward from the bottom far enough to cause the air to pass upward and over the top of the same and against and down the fire box or chamber-plate *c*, Figs. 3 and 4, and then into the oven, as aforesaid. The said hot-air chamber or flue A' may be of any capacity desired and carry out the design or object of the same. It will be seen that this chamber A' answers a twofold purpose, to wit: First, the air entering therein is highly heated, so as to facilitate baking in the said oven; and, second, the cold air entering therein comes in contact with the front plate *c*, and thereby prevents the too rapid burning out of the said front plate, and while descending the said plate becomes heated sufficient for baking purposes when it shall have entered the oven *i* in the manner aforesaid.

The front part of the said oven opens directly into the said roaster, the said front doors K being thrown open for that purpose. The roaster being taken away when not required for immediate use, the said doors K are closed. When the said front doors are open and no roaster is placed therein, as aforesaid, a large amount of heat is radiated into the room where the stove is used from the oven and the fire box or chamber over the front end of said oven, which in cold weather is desirable when the oven is not in use for baking purposes.

Having thus described my original improvements in cooking-stoves of January, 1859, what I claim as my invention and improvements therein is—

1. The supplying of a continued current of air heated by the front plate of the fire-box or chamber and in a flue or space immediately in front of the same, and without the aid of any intervening plates, to the oven of a stove in which the oven is in the rear of the fire-chamber, and at the same time extending under and beyond it, so as to include the said flue or space and permit the said heated air to freely enter the said oven, in the manner and for the purposes substantially as herein described and set forth.

2. In a stove constructed with an oven and fire box or chamber substantially like the one herein above described, the making the front plate to open with the doors K and the attaching an apron in front so as to hold and receive a kitchen or other roaster, substantially as specified, so that the heat radiated by the front plate of the fire box or chamber shall be aided by the heat radiated by the oven-plates, in the manner and for the purposes substantially as herein described and set forth.

3. The employment of the additional or extra bottom *v*, in combination with the three-flue bottom of a cook-stove, (and with space between the same,) in the manner substantially as and for the purpose herein described and set forth.

4. The employment of the additional or extra back *u*, in combination with the ascending and descending flues at the back end of the oven, in the manner substantially as and for the purposes herein described and set forth.

5. The boiler having a removable top or cover and two inclined flues which are separate at the lower end and unite into one at the top, so as to connect with the pipe leading to the chimney, substantially as and for the purposes herein described and set forth.

In testimony whereof I have on this 23d day of January, 1864, hereunto set my hand.

PHILO P. STEWART.

Witnesses:

CHAS. D. KELLUM,
MARCUS P. NORTON.